United States Patent [19]

Cricchi

[11] 3,877,058

[45] Apr. 8, 1975

[54] RADIATION CHARGE TRANSFER MEMORY DEVICE

[75] Inventor: James R. Cricchi, Catonsville, Md.

[73] Assignee: Westinghouse Electric Corporation, Pittsburgh, Pa.

[22] Filed: Dec. 13, 1973

[21] Appl. No.: 424,530

[52] U.S. Cl. .................... 357/24; 357/23; 357/30; 357/54; 307/304; 307/311

[51] Int. Cl. .................... H01l 15/00; H01l 11/14

[58] Field of Search ..... 317/235 G, 235 AZ, 235 N, 317/235 B; 340/173 LS; 307/311, 304; 357/23, 24, 54, 30

[56] References Cited

UNITED STATES PATENTS

| | | | |
|---|---|---|---|
| 3,657,614 | 4/1972 | Cricchi | 317/235 R |
| 3,702,465 | 11/1972 | Cricchi | 340/173 LT |
| 3,795,806 | 3/1974 | Eichelberger | 250/21 LJ |

OTHER PUBLICATIONS

Salama, Electronics Letters, Vol. 8, No. 2, Jan. 27, 1972. pp. 21–22.

*Primary Examiner*—Martin H. Edlow
*Attorney, Agent, or Firm*—J. B. Hinson

[57] ABSTRACT

An MNOS radiation charge transfer memory device wherein charge generated in a semiconductor body by radiation is transferred through a surface inversion layer and an oxide layer to a silicon-nitride-oxide interface for storage. The readout voltage is proportional to the charge density stored. Therefore, it is possible to realize a gain proportional to the ratio of the junction sensor area to the nitride-oxide memory gate area. The device may be applied to optically accessed digital or analog memories.

5 Claims, 7 Drawing Figures

RADIATION CHARGE TRANSFER MEMORY DEVICE

BACKGROUND OF THE INVENTION

As is known, memory elements have been developed that utilize the hysteresis effects observed in connection with certain insulators in MIS field effect transistors. In the more conventional approaches to the application of transistors to provide information storage, the transistors, which exhibit no hysteresis, are combined into a circuit that does exhibit hysteresis. Memory function is then a property of the circuit. This requires many elements to achieve a single bit storage.

The usual form of transistor memory element is a standard insulated-gate field effect transistor structure in which the silicon dioxide gate insulator is replaced by a double insulator, typically a layer of silicon dioxide nearest the silicon substrate and a layer of silicon nitride over the silicon dioxide. This structure is commonly called a metal-nitride-oxide-semiconductor memory transistor (MNOS). Hysteresis in a device of this type is associated with the existence of traps (electronic states) at or near the silicon dioxide-silicon nitride interface; and the threshold voltage of the field effect transistor is influenced by the charged state of the traps.

There are several possible modes of operation by which the traps can be charged and discharged. The more conventional of these includes direct tunneling between the traps and the silicon; Fowler-Nordeim tunneling through the silicon dioxide barrier; bulk conduction in the silicon nitride which can be in the form of several different mechanisms; and direct carrier injection over the Schottky barrier between the silicon and the silicon dioxide. In all cases, traps exist at or near the interface between the silicon dioxide and silicon nitride layers. These traps are conventionally charged and discharged by the application of a sufficiently large voltage of suitable polarity to the gate electrode; while information is read out of the device via the source and drain electrodes of the field effect transistor.

SUMMARY OF THE INVENTION

In accordance with the present invention, a new and improved metal-nitride-oxide-semiconductor radiation sensing and charge transfer memory device is provided. The radiation stores an amount of charge at a nitride-oxide insulator surface that is proportional to the charge dissipated by a P-N junction during the time that the junction is exposed to radiation. The charge stored at the nitride-oxide interface changes the threshold voltage of the MNOS device, making it possible to read out a surface inversion layer current proportional to the radiation induced current. After readout, the radiation charge transfer memory can be reset by means of an applied gate voltage to the dark current level and the junction charged for the next cycle.

The above and other objects and features of the invention will become apparent from the following detailed description taken in connection with the accompanying drawings which form a part of this specification, and in which.

Figure 1:
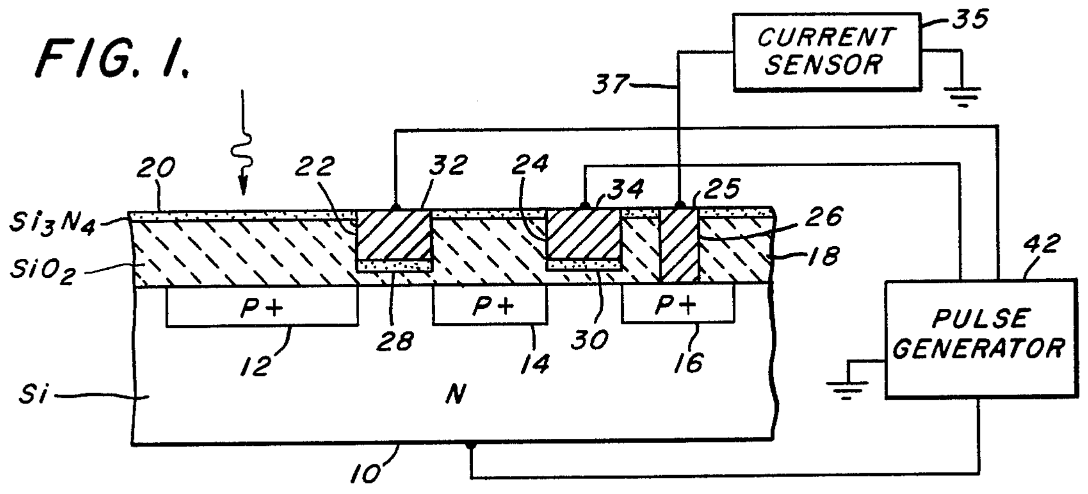
FIG. 1 is a cross-sectional view of a typical MNOS radiation charge transfer memory device constructed in accordance with the principles of the invention.
Figures 2, 4:
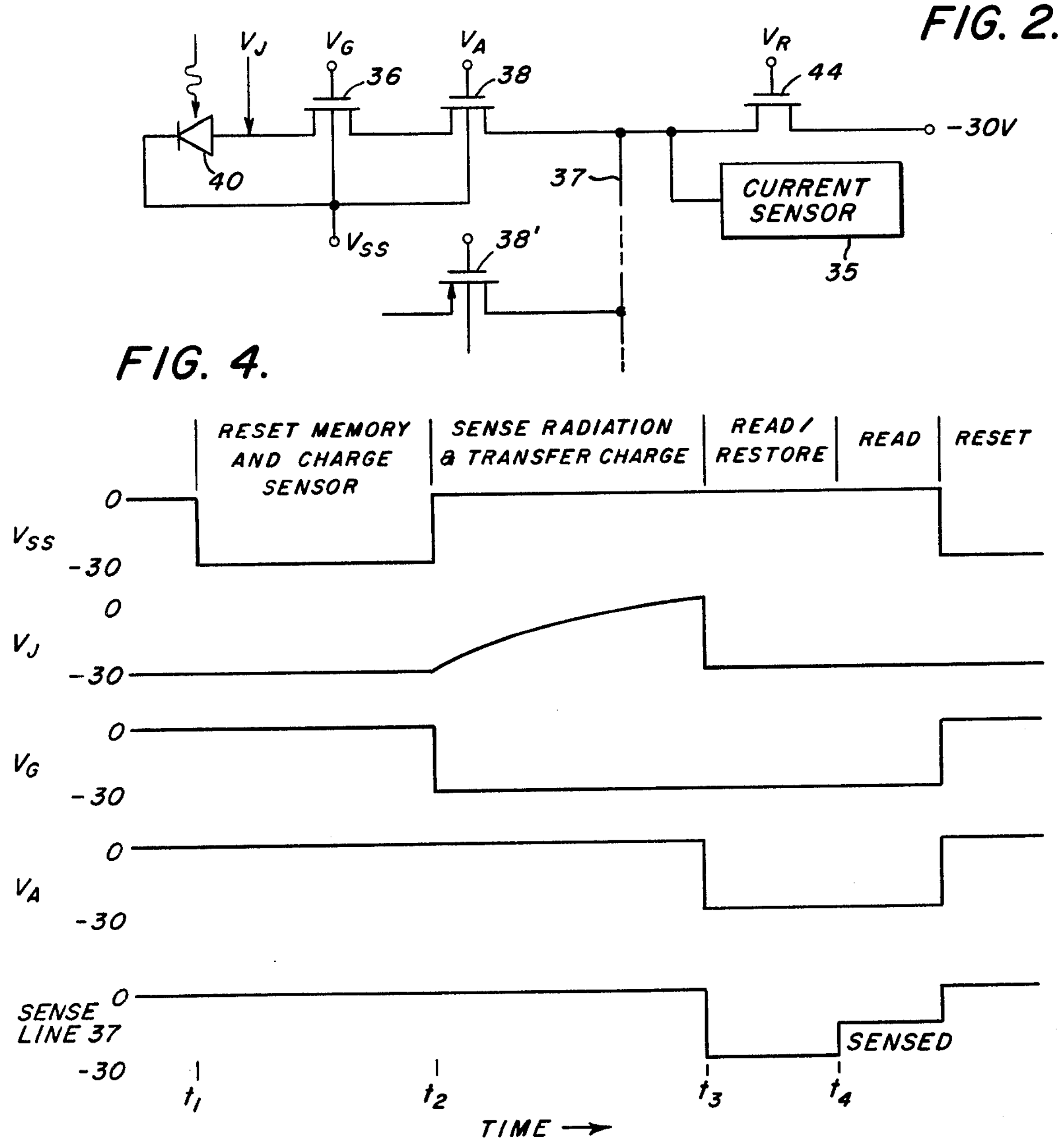
FIG. 2 is an equivalent circuit diagram of the device of FIG. 1.
FIG. 4 illustrates voltages appearing at various points in the circuits of FIGS. 1 and 2.

With reference now to the drawings, and particularly to FIGS. 1 and 2, the device shown includes a substrate 10 of N-type silicon having P+ regions 12, 14 and 16 diffused into its upper surface. Covering the P+ diffusions 12–16 is a layer 18 of silicon dioxide; and above the layer of silicon dioxide is a layer 20 of silicon nitride. Formed in the oxide layers are openings 22, 24 and 26, which can be formed by conventional etching techniques. The opening 26 extends all the way to the P+ diffusion 16; while the openings 22 and 24 extend only part way through the silicon dioxide layer 18 and have formed at their bottoms layers 28 and 30 of silicon nitride. Above the layers 28 and 30 of silicon nitride are metallic electrodes 32 and 34 which fill most of the space provided for by the openings 22 and 24.

The showing in FIG. 1 is distorted for purpose of explanation. Typically, the spacing between the lower surface of the silicon nitride layers 28 and 30 and the upper surface of the substrate 10 is about 50 Angstrom units; while the silicon dioxide layer 18 typically has a thickness of about 10,000 Angstrom units; and the silicon nitride layer 20 has a thickness of about 1000 Angstrom units. Diffusions 12 and 14, together with the silicon nitride layer 28, form a first transistor which functions as an MNOS storage device and is identified by the reference numeral 36 in FIG. 2; while diffusions 14 and 16 form with the silicon nitride layer 30 a second transistor which serves as an MNOS access switch identified by the reference numeral 38 in FIG. 2. The P+ diffusion 12 forms a P-N junction with the substrate 10 and is identified as a diode 40 in FIG. 2. Suitable pulse generating means 42 is connected to the substrate 10 and to the gate electrodes 32 and 34 of devices 36 and 38 to supply the necessary bias and gate voltages as described hereinafter. A current sensor 35 is connected via metalization 25 to the P+ diffusion 16 of transistor switch 38. Preferably, the current sensor 35 is connected to the access switch 38 by means of a sense line 37 which may also be connected to other MNOS memory devices similar to that of FIG. 1, represented by the transistor 38′ of one such device. The sensor 35 may, of course, be any desired type of sensing or readout device. The sense line 37 may be connected to a voltage source by a suitable device shown as an external transistor switch 44.

Figures 3A, 3B, 3C:
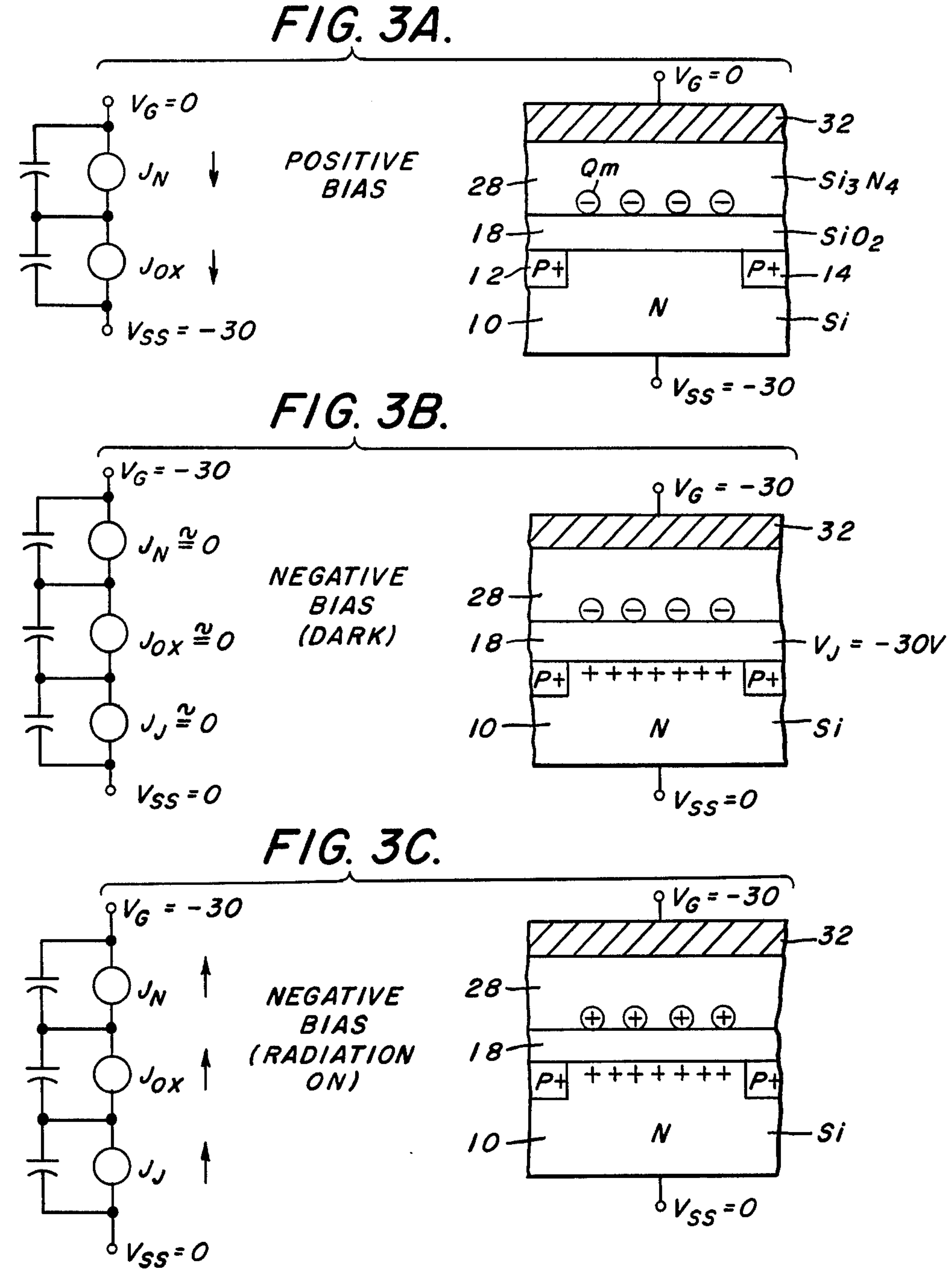
FIGS. 3A, 3B and 3C illustrate the charges existing at the nitride-oxide interface and the formation of an inversion layer under varying conditions.

The charges stored at the nitride-oxide interface beneath the metalizations 32 and 34 under varying conditions are shown in FIGS. 3A–3C. In FIG. 3A, conditions are shown for the case where a positive bias is applied across the silicon dioxide insulator, the substrate being at a negative voltage and the gate electrode at zero volts. Under these circumstances, the charge $Q_m$ stored at the nitride-oxide interface for a positive bias is dependent only on the applied voltage which appears across the entire gate insulator. For negative applied gate voltages, an inversion layer is formed as shown in FIG. 3B which becomes connected to the radiation sensing diffused junction 40 (i.e., the P-N junction formed between area 12 and substrate 10). For the dark condition (no radiation) as shown in FIG. 3B, the current through the three current generators identified as $J_n$, $J_{ox}$ and $J_j$, representing the current densities in the nitride layer, the oxide layer and the junction, respectively, is very small since the generation current for the dark condition is small and very little voltage is applied across the insulators. In the presence of radiation, the junction becomes discharged by the radiation sensitive current generator (FIG. 3C), and an equivalent current must flow through the insulators. The amount of charge transferred to and stored at the oxide-nitride interface is then a function of the radiation generated current integrated over the period of radiation. Since the threshold voltage of the nitride-oxide transistor 36 is linearly related to the charge stored at the nitride-oxide interface, non-destructive readout of the stored charge is made possible.

A simplified design equation of the structure may be written $$J_j = J_{ox} = dQ_I/dt + J_n$$

which is based on the assumption that negligible charge is stored at the semiconductor-oxide interface during the time that the junction is illuminated and the memory pulse is applied. The charge stored at the nitride-oxide interface is:

$$Q_I = \int J_j\,dt = \int (J_{ox} - J_n)\,dt$$

where:

$$J_j = f\,(\text{generation rate}, S, A_j);$$

$$J_{ox} = f(V_A - V_{FB} - V_J, X_{ox}, X_n, \epsilon_{ox}, \epsilon_n, A_G) = C_1 E_{ox}^2 \exp - C_2/E_{ox};$$

and $$J_n = f(V_A + V_{FB} - V_J, X_{ox}, X_n, \epsilon_{ox}, \epsilon_n, A_G) = C_3 E_n \exp C_4 E_n^{1/2}.$$

The terms are defined as below:

$Q_I$ = charge stored at the nitride-oxide interface per unit area;
$J_j$ = junction current density;
$J_{ox}$ = oxide current density;
$J_n$ = nitride current density;
$V_A$ = voltage applied to the gate;
$V_{FB}$ = flatband voltage $- X_n/\epsilon_n\, Q_I$;
$V_j$ = junction voltage;
$X_{ox}$ = oxide thickness;
$X_n$ = nitride thickness;
$\epsilon_{ox}$ = oxide permittivity;
$\epsilon_n$ = nitride permittivity;
$A_G$ = gate area of the nitride-oxide memory device;
$A_J$ = junction area of the light sensing junction;
$S$ = surface recombination velocity;
$E_{ox}$ = oxide electric field;
$E_N$ = nitride electric field; and
$C_1$—$C_4$ = empirically derived constants.

The device has a charge stored ($Q_I$) to charge/area generated ($Q_G$) gain:

$$Q_I/Q_G = A_G/A_J$$

which is proportional to the ratio of the radiation sensing junction area to the nitride-oxide gate area. A stored charge range over at least one decade can readily be detected as a threshold voltage shift of 10 volts. For example, if a charge density of $10^{11}/cm^2$ is stored, a 1-volt shift in the threshold voltage of device 36, $V_T$, would be detected. If a charge density of $10^{12}/cm^2$ is stored, a 10-volt shift in the threshold voltage would be detected. The device operates properly under non-equilibrium conditions. It must be periodically reset to the dark current condition to minimize the effects of normal junction leakage currents which would discharge the preset values over a long period of time.

The operation of a memory device as shown in FIG. 1 is illustrated in FIG. 4. As there shown, the device is reset at time $t_1$ by changing the voltage $V_{ss}$ of the substrate 10 from zero to −30 volts, the gate voltages $V_G$ and $V_A$ of the devices 36 and 38, respectively, being zero. The conditions are then as represented in FIG. 3A, the junction 40 being forward biased with a voltage $V_J$ of −30 volts, and the device is reset in a time that may be of the order of one to ten microseconds, for example.

At the time $t_2$, therefore, the device is in condition to sense radiation and store the corresponding charge in the manner described above. For this purpose, the substrate voltage $V_{ss}$ is returned to zero and a gate voltage $V_G$ of −30 volts is applied to the gate 32 of device 36. If the junction is dark, that is, if no radiation is present to be sensed, the conditions are as shown in FIG. 3B and the junction voltage $V_J$ remains at −30 volts. If the junction is subjected to radiation, however, the conditions are those of FIG. 3C and the junction discharges toward ground, the voltage $V_J$ decreasing exponentially to zero. The corresponding positive charge is simultaneously stored at the nitride-oxide interface of the device 36 as previously described, the charge being proportional to the discharge current integrated over the time period involved which may, for example, be from one microsecond to one second.

Long integration times may be achieved by recharging the sensing junction 40 without resetting the device. This may be done at time $t_3$ by applying a gate voltage $V_A$ of −30 volts to device 38 and a read/restore voltage $V_R$ to the external switch device 44. These devices are thus made conductive and function as switches to connect the junction 40 through the sense line 37 to a voltage source of −30 volts. The junction is recharged to a voltage $V_J$ of −30 volts in a time which may be of the order of one microsecond.

At the time $t_4$, therefore, the readout voltage appears on the sense line 37 and can be sensed by the current sensor 35, or other readout device. As previously indicated, the threshold voltage $V_T$ of the device 36 is proportional to the stored charge. The readout voltage on the line 37 is equal to the difference between the applied gate voltage and the threshold voltage ($V_G - V_T$) and is thus a direct measure of the stored charge and of the radiation level sensed by the junction 40. The readout period may also be of the order of one microsecond, after which the device may be reset for another cycle as at $t_1$.

Figure 5:
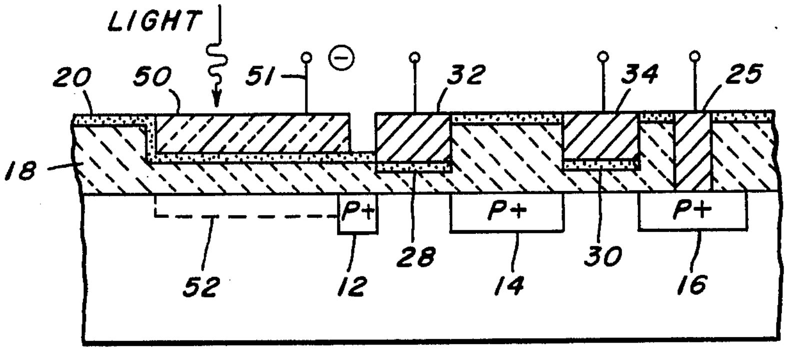
FIG. 5 is an illustration of an alternative embodiment of the invention, somewhat similar to that of FIG. 1.

With reference now to FIG. 5, another embodiment of the invention is shown wherein elements corresponding to those of FIG. 1 are identified by like reference numerals. In this case, however, radiation passes through a transparent electrode 50 preferably formed from a material such as tin oxide or some other transparent conducting material. The electrode 50 is connected to a field terminal 51 which, when negatively charged, will induce a light sensing junction 52. The operation of the device is essentially the same as that described above with the exception that the light sensing junction is field induced rather than being formed by a diffused region in the substrate.

Although the invention has been shown and described in connection with certain specific embodiments, it will be readily apparent to those skilled in the art that various changes in form and arrangement of parts may be made to suit requirements without departing from the spirit and scope of the invention.

What is claimed is:

1. A metal-nitride-oxide radiation charge transfer memory device comprising a substrate of semiconductor material of one conductivity type, three diffused regions of opposite conductivity type in one surface of said substrate, one of said regions forming a radiation sensitive P-N junction with the substrate, an oxide layer covering the surface of the substrate, a nitride layer covering the oxide layer, a first gate region disposed between said one diffused region and a second of said diffused regions to form a first transistor therewith, a second gate region disposed between said second diffused region and the third diffused region to form a second transistor, each of said gate regions comprising a region of reduced thickness of the oxide layer and including means for making electrical connection to the gate region, means for making electrical connection to the substrate, and conducting means extending through said oxide and nitride layers for making electrical connection to said third diffused region.

2. The device of claim 1 in which each of said gate regions consists of an opening extending through the nitride layer and part way through the oxide layer, a nitride layer covering the oxide layer at the bottom of the opening, and a metallic electrode filling the opening to make electrical connection to the gate region.

3. The device of claim 1 and including means for applying a bias voltage across said first gate region to reset the device and for reversing said voltage to effect charge storage at the interface of the oxide and nitride layers as determined by the current through said junction, means for applying a voltage to said second gate region to make said second transistor conductive, and means for connecting a readout device to said third diffused region to sense a readout current determined by said stored charge.

4. The device of claim 3 and including means for connecting a voltage source to said third diffused region while the second transistor is conductive.

5. The device of claim 1 having a transparent electrode on the nitride layer adjacent said first gate region, and means for making electrical connection to said electrode.

* * * * *